Patented May 14, 1946

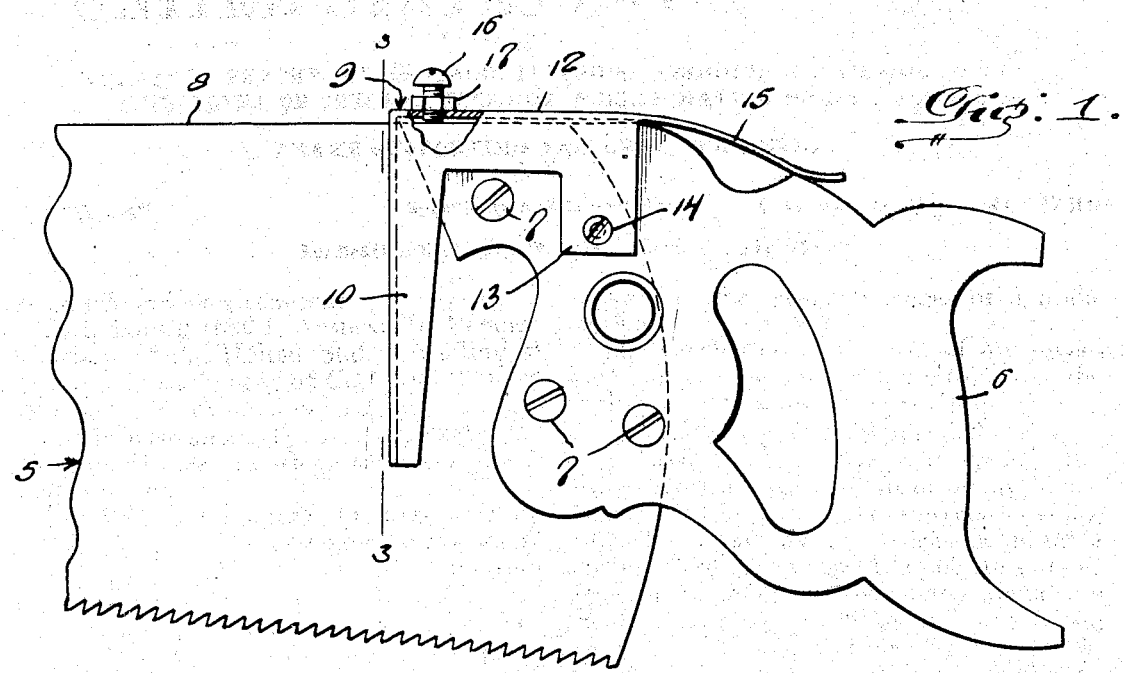
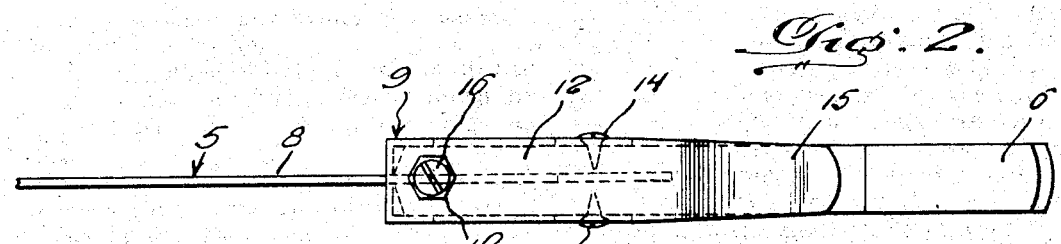
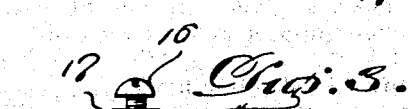
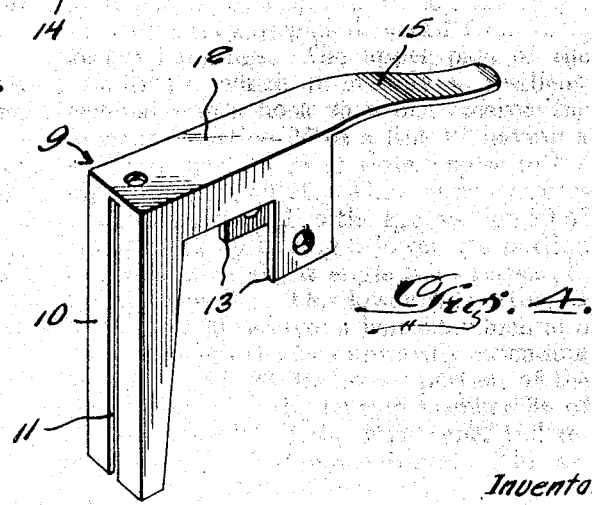

2,400,311

UNITED STATES PATENT OFFICE 2,400,311

COMBINATION HAND SAW AND TRY SQUARE

Joseph A. Mayer, Petaluma, Calif.

Application June 1, 1945, Serial No. 597,063

2 Claims. (Cl. 7—13)

This invention relates to a combination hand saw and try square, and has particular reference to a novel device adapted to be applied to the handle of a hand saw and to coact with the saw blade to provide, in connection with the back edge of the saw blade, a try square.

The primary object of the present invention is to provide a combination tool of the above kind which is simple in construction, efficient in use, and economical to produce.

A further object of the invention is to provide a simple device of the above kind that may be readily applied to a hand saw to provide a tool of the kind set forth, and that may be readily adjusted to the proper position relative to the saw blade.

In the drawing:

Figure 1 is a fragmentary side elevational view of a hand saw equipped with a device constructed in accordance with the present invention.

Figure 2 is a top plan view thereof.

Figure 3 is a vertical section taken on line 3—3 of Figure 1.

Figure 4 is a perspective view of the device applied to the hand saw in Figure 1.

Referring in detail to the drawing, 5 designates the blade of a conventional hand saw and 6 the handle thereof having a slot mid-way between the sides and in one end thereof in which the rear wider end of the blade is secured by the usual bolts 7. The blade 5 has a straight back edge 8.

In accordance with the present invention, a special device is applied to the saw handle 6 and coacts with the saw blade 5 to provide a try square. This device consists of a right angular channel member 9, one arm 10 of which is longitudinally slotted at 11 midway between the sides thereof to straddle and snugly receive the saw blade 5, the other arm 12 of member 9 snugly fitting over the upper edge portion of the saw handle 6 and having depending ear extensions 13 on the side flanges thereof. Screws 14 or the like pass through the ear extensions 13 to pivotally secure the member 9 to the handle 6. The arm 12 has a rearward resilient leaf spring extension 15 on the rear end of the web thereof which is arranged to bear on the upper edge of the saw handle 6 rearwardly of the blade 5 and which is tensioned to engage said edge when the arm 10 is disposed at an obtuse angle to the portion of the back edge 8 of the saw blade which is located forwardly of said arm 10. An adjusting screw 16 is threaded through the forward end of arm 12 to impinge the upper edge of the saw handle 6, and this set screw is used to adjustably swing the member 9 about the pivotal point provided by screws 14 so as to place the spring extension 15 under considerable tension and adjust the arm 10 of member 9 at a right angle to the portion of the back edge 8 of saw blade 5 located forwardly of said arm 10.

In using the tool in one well known way, the portion of arm 10 at either side of the saw blade 5 may be disposed against a side edge of a board, and the back edge 8 of the saw blade 5 will extend across the board at a true right angle to said side edge and the arm 10. Thus, the back edge of the saw blade may be used as a straight edge to mark a line across the board for use as a guide in sawing the board to a desired length and along a transverse line at a right angle to the side edge of the board.

It will be seen that the invention is simple, efficient, and otherwise adapted to meet with the requirements for successful commercial use. A jamb nut 17 secures the screw 16 in adjusted position.

What I claim is:

1. In combination with a hand saw embodying a blade having a straight back edge and a slotted handle having an end of the blade secured in the slot thereof, a right angular channel member, one arm of said channel member having a central longitudinal slot receiving the saw blade, the other arm of said channel member fitting over the upper edge of the saw handle and having depending ear extensions on the side flanges thereof, means passing through said ear extensions to pivotally secure said channel member to the saw handle, a rearward resilient leaf spring extension on the web of said other arm bearing on the upper edge of the saw handle and tensioned to engage said edge when the one arm of said channel member is disposed at an obtuse angle to the back edge of the saw blade, and means to swing said channel member relative to the saw handle to increase the tension of said spring extension and dispose said one arm at a right angle to the back edge of the saw.

2. The construction set forth in claim 1, wherein said means consists of a set screw adjustably threaded through said other arm forwardly of said ear extensions and impinging the upper edge of the saw handle.

JOSEPH A. MAYER.